US006886943B1

(12) United States Patent
Greenberg et al.

(10) Patent No.: US 6,886,943 B1
(45) Date of Patent: May 3, 2005

(54) HIGH-RESOLUTION PROJECTION DISPLAY SYSTEM

(75) Inventors: Michael R. Greenberg, Santa Rosa, CA (US); Matthew W. Bellis, Santa Rosa, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/693,594

(22) Filed: Oct. 24, 2003

(51) Int. Cl.[7] .................. G03B 21/26; G03B 21/28; G02B 27/10; G02F 1/1335; G02F 1/00

(52) U.S. Cl. .................. 353/94; 353/20; 353/34; 353/37; 353/82; 353/84; 353/99; 353/102; 359/246; 359/618; 348/743; 348/750; 349/9; 345/1.3

(58) Field of Search .................. 353/94, 20, 30, 353/31, 33, 34, 37, 84, 98, 99, 102, 29, 81, 82; 359/237, 245, 259, 315, 318, 618, 246; 348/742, 743, 744, 750, 751, 756; 345/84, 85, 87, 1.1, 1.3; 349/5, 7–9

(56) References Cited

U.S. PATENT DOCUMENTS

| | | |
|---|---|---|
| 5,311,349 A | 5/1994 | Anderson et al. ........... 359/223 |
| 5,729,245 A | 3/1998 | Gove et al. .................... 345/84 |
| 5,777,588 A | 7/1998 | Woodgate et al. .............. 345/6 |
| 5,798,819 A | 8/1998 | Hattori et al. ................. 353/33 |
| 5,921,650 A | 7/1999 | Doany et al. ................. 353/31 |
| 5,982,541 A | 11/1999 | Li et al. ...................... 359/497 |
| 6,337,724 B1 * | 1/2002 | Itoh et al. ..................... 349/75 |
| 6,398,389 B1 | 6/2002 | Bohler et al. ............... 362/293 |
| 6,473,240 B1 * | 10/2002 | Dehmlow .................... 359/630 |
| 6,480,259 B1 | 11/2002 | Wong et al. .................. 355/52 |
| 6,512,609 B1 | 1/2003 | Klug et al. .................... 359/23 |
| 6,547,396 B1 * | 4/2003 | Svardal et al. ................. 353/8 |
| 6,773,111 B2 * | 8/2004 | Yamamoto .................. 353/20 |
| 2001/0048801 A1 * | 12/2001 | Saccomanno ............... 385/147 |

\* cited by examiner

*Primary Examiner*—Judy Nguyen
*Assistant Examiner*—Rochelle Blackman
(74) *Attorney, Agent, or Firm*—Allen, Dyer, Doppelt, Milbrath & Gilchrist, P.A.

(57) ABSTRACT

An image display system uses a polarizing beam splitter to direct light from a lamp to multiple spatial modulators. The spatial light modulators ("SLM") each generate an image portion, which are stitched together on a display screen to obtain a high resolution image. In particular embodiment, image portions from two conventional SLMs, each controlling about two million pixels, are stitched together to form an image having about four million pixels. In another embodiment, two lamps are used with four SLMs to produce a resultant image having about eight million pixels.

15 Claims, 3 Drawing Sheets

HIGH-RESOLUTION PROJECTION DISPLAY SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention relates generally to image display systems, and more particularly to projection display systems using a plurality of spatial light modulators illuminated with light from a lamp, partial images from the spatial light modulators being combined to form a high-resolution image on a display screen.

BACKGROUND

Projection display systems use spatial light modulators ("SLMs") to modulate light from a lamp to produce high-quality images suitable for home theater, large-format front projectors, such as digital cinema, projectors for business conferences, and rear-projection television. The resolution of such systems is related to the number of picture cells ("pixels") that the SLM generates. The image from the SLM is magnified and projected onto a display screen. Generally, a larger SLM will generate more pixels than a smaller SLM with similarly sized actuator cells. Conversely, if the size of the actuator cell is reduced, an SLM of a fixed size can generate more pixels. However, SLMs suitable for large-format displays might not have suitable resolution for other applications, such as medical imaging, satellite imaging, or other display applications requiring very high information content.

A viewer typically sits relatively far back from a large-format display screen, where the viewer's eye smooths the pixellated image. Unfortunately, the resolution acceptable for large-screen displays might not be suitable for high-resolution displays, where the viewer is relatively close to the displayed image and a higher information density is desired. One technique to provide a high-resolution image is to provide SLMs with more actuator cells, either by making a larger SLM chip or by reducing the size of the actuator cells. Unfortunately, both approaches adversely affect yield-per-wafer and cost.

Multiple SLMs have been used in image display systems for various reasons. One technique overlays images from multiple SLMs to increase the brightness of the resultant image. Another technique interleaves images from multiple SLMs that control different colors of light operating at a reduced duty cycle (e.g. 50% duty cycle when using two SLMs). Using multiple SLMs allows the use of slower SLMs to achieve a higher apparent refresh rate, but does not increase the resolution of the display.

SUMMARY OF THE INVENTION

The present invention enables high-resolution image display systems. In some embodiments, a single lamp is used. The lamp output is homogenized in a light integrator, which provides a homogenized light output. The homogenized light output is split into first and second light beams with a beam splitter. A first imager optically coupled to the first light beam produces a first modulated light beam that is optically coupled to first projection optics. The projection optics expand the first modulated light beam to form a first display image portion on a display screen. A second imager optically coupled to the second light beam produces a second modulated light beam that is optically coupled to second projection optics. The second projection optics expand the second modulated light beam to form a second display image portion on the display screen. The first display image portion and the second display image portion are combined at a margin to form a display image. An optional fold mirror(s) is used to enable a more compact projection system.

In a particular embodiment, the beam splitter is a polarizing beam splitter and the imagers are LCoS SLMs. The first light beam from the polarizing beam splitter has a first polarization state and the second light beam from the polarizing beam splitter has a second polarization state. A half-wave retarder plate in the path of the first light beam rotates the polarization state to operate in conjunction with the LCoS SLM. Thus, the fill output of the lamp is utilized without polarization recovery, and resolution of the display image is enhanced.

DETAILED DESCRIPTION OF THE INVENTION

I. Introduction

A projected image is formed from partial images produced by a plurality of SLMs. The modulated light from the each SLM forms a portion of the projected image, and the portions are combined ("stitched") to form a high-resolution image on a display screen. For example, image portions from two SLMs, each having two million pixels, are stitched together to form a projected image having about four million pixels.

In one embodiment, liquid-crystal on silicon ("LCoS") SLMs are used. LCoS SLMs modulate polarized light by reflection. In conventional image display systems, unpolarized light from the lamp is filtered with a pre-polarizer and light having the undesired polarization state is discarded, reducing brightness. Altenatively, light having the undesired polarization state is converted to light of the desired polarization state and is provided to a LCoS SLM. Such techniques are known as polarization conversion/recovery systems, but increase the complexity, cost, size, and weight of the display system.

In an embodiment of the present invention, unpolarized light from a lamp is split into two polarization states using a polarizing beam splitter ("PBS"). Light having the first polarization state is directed to a first SLM, and light having the second polarization state is directed at a second SLM. The SLM can be a LCoS SLM or other type of SLM, such a digital mirror display ("DMD") having a plurality of separately actuated micromirrors, or a transmissive SLM. The present invention enables the full output of the lamp to be utilized without resorting to polarization recovery or conversion schemes. Similarly, a single set of homogenizing optics, and in some embodiments relay optics, are shared by multiple SLMs.

II. Exemplary Display Systems

Figure 1A:
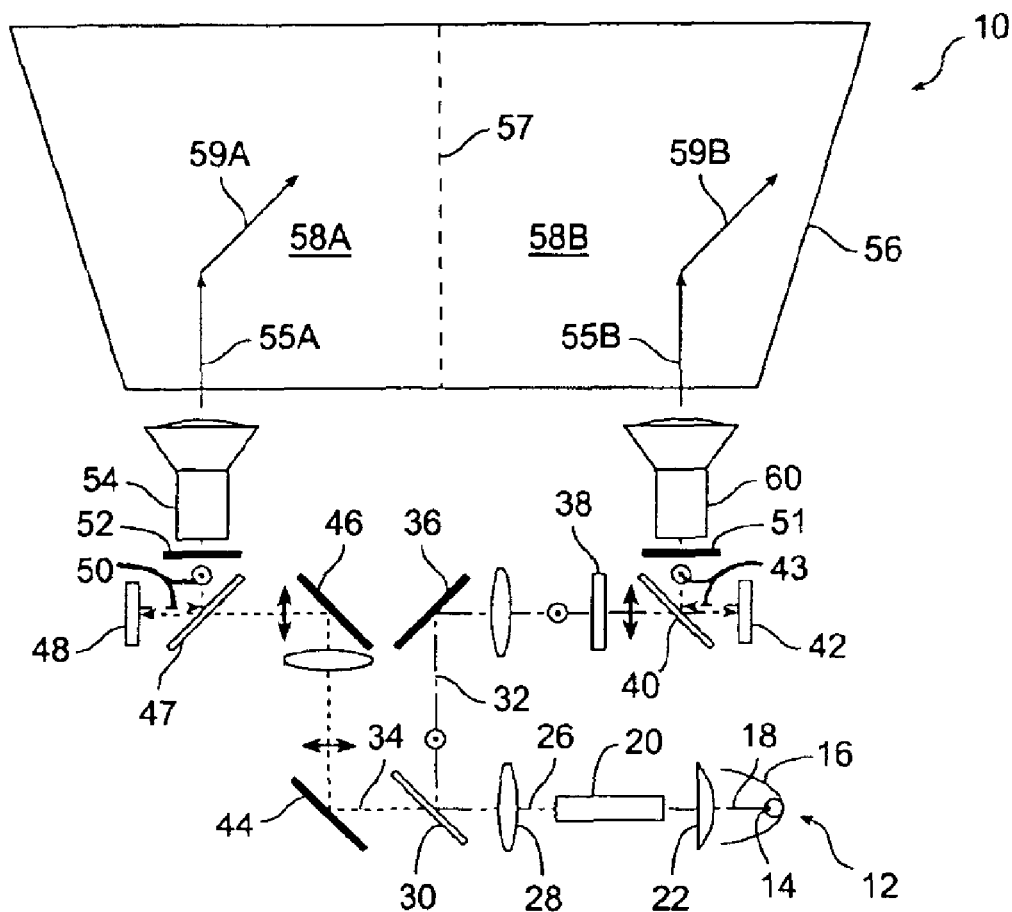
FIG. 1A is a simplified diagram of a monochrome image display system according to an embodiment of the present invention.

FIG. 1A is a simplified diagram of a monochrome image display system 10 according to an embodiment of the present invention. A lamp 12 having an arc 14 or filament and a reflector 16 provides unpolarized light 18 to a light integrator 20, typically through a condenser lens 22. The arc 14 generates non-uniform light, and the light integrator converts the non-uniform light from the arc 14 into a homogenized light beam 26. Examples of light integrators include light rods and light tunnels, and are recirculating (recycling) or non-recirculating in alternative embodiments.

A lens 28 couples the homogenized light beam 26 from the light integrator 20 to a wire-grid PBS 30, which reflects light having a first polarization state 32 and transmits light having a second polarization state 34. Alternatively, a thin-film PBS or other PBS is used. Alternatively, a 50/50 non-polarizing beam splitter is used; however, a PBS enables efficient use of the lamp output, and a wire-grid PBS enables a wide spectral band and good cone illumination, and hence is particularly desirable. The wire-grid PBS splits the light from the lamp 12 into two separate light beams, which are then directed to two SLMs 42, 48. It is desirable to position the wire-grid PBS 30 in a telecentric optical space to maintain color uniformity across the projected image. Light of the first polarization state 32 is reflected to an optional fold mirror 36, which reflects the light to a half-wave retarder plate 38. The half-wave retarder plate rotates the light from the first polarization state to the second polarization state, which is passed through another wire-grid PBS 40 to a LCoS SLM 42. Light falling on a pixel of a LCoS SLM in the dark state is unmodified and is reflected back through the PBS 40. Light falling on a pixel of a LCoS SLM in the bright state rotates the incident polarized light 90°. The rotated light 43 is reflected by the PBS 40 through an optional polarization analyzer 51 to projection optics 60. Imaging off the wire-grid PBS 40 in reflection (rather than imaging the transmitted beam) provides a higher quality image, but an alternative image display system images the light transmitted through the wire-grid PBS. The polarization analyzer is basically an absorptive filter that removes light of the undesired polarization state to improve the contrast of the projected image. The optional fold mirrors keep the light path from the lamp to the display screen 56 contained within a compact spatial envelope, which is particularly desirable for rear-projection image display systems.

Light of the second polarization state 34 is transmitted to optional fold mirrors 44, 46, and then through a wire-grid PBS 47 to another LCoS SLM 48. A pixel of the LCoS SLM in the dark state is unmodified and is reflected back through the PBS 47. A pixel of the LCoS SLM in the bright state rotates the incident polarized light 90° to the complimentary polarization state. The rotated light 50 is coupled to the PBS 47, which reflects the rotated light 50 through an optional polarization analyzer 52 to projection optics 54.

The projection optics 54 expand the image from the SLM 48 to form a first contiguous (i.e. continuous two-dimensional) display image portion 58A on a first portion of an optional fold mirror 56. Similarly, the image from the other SLM 42 is expanded by second projection optics 60 to form a second contiguous display image portion 58B on a second portion of the fold mirror 56. Light from the projection optics, represented as arrows 55A, 55B is reflected off the fold mirror 56 to a display screen (see FIG. 1B, ref. num. 61). The reflected light is represented by arrows 59A, 59B. It is understood that representation of the image portions using arrows is for simplicity of illustration, in particular, that the projection optics 54, 60 provide fields of illumination.

The first 58A and second 58B image portions are combined on the display screen at a margin essentially equivalent to the margin 57 between the image portions on the fold mirror 56. In a particular embodiment, the fold mirror 56 is trapezoidal to account for the expanding footprint of the image portions from the projection optics, which increases with increased distance from the projection optics. The image portions combine on the display screen to form a display image with approximately the combined number of pixels as are contained in the first 42 and second 48 SLMs. In many cases, the first and second SLM will be identical, but this is not required. Similarly, it is not required that the first and second SLM be of the same type. For example, a first SLM could be a LCoS SLM, and the second SLM could be a transmissive liquid-crystal light valve or digital mirror display. LCoS SLMs are particularly desirable for use in high-resolution monochrome display systems because they can be controlled to provide a gray-scale output. An analog LCoS device produces a gray-scale output according to the amplitude of the control input signal, and a digital LCoS device produces a gray-scale output by modulating pulse width of the control input signal.

Those of ordinary skill in the art will appreciate that the image display system shown in FIG. 1A is merely exemplary. Several other topologies are possible, and various combinations of fold mirrors are alternatively used. It is generally desirable that the optical path lengths between the output of the light integrator 20 and SLMs 42, 48 are similar in the two sub-image paths to permit common relay optics to be used in both paths. The image display system enables a high-resolution projection display image to be stitched from partial images generated by conventional SLMs using a single lamp and light integrator. The number of pixels in the display image is essentially the sum of the pixels modulated by the first and second SLMs. The display image (formed from display image portions 58A+58B) is shown as being divided into right- and left-hand portions, but could be divided into upper and lower portions. Generally, the form factor of an image portion is equivalent to the form factor of the associated SLM, which is typically rectangular. Using a single lamp in combination with a single light integrator and PBS enables efficient utilization of the light from the lamp, and results in lower power consumption and heat generation for a given display brightness compared to display systems that "dump" unwanted light.

Figure 1B:
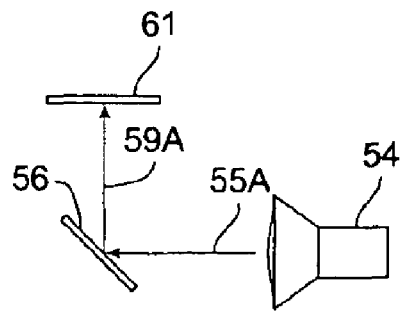
FIG. 1B is a simplified side view of a portion of the image display system of FIG. 1A illustrating the relationship of the fold mirror to a display screen.

FIG. 1B is a simplified side view of a portion of the image display system of FIG. 1A illustrating the relationship of the fold mirror 56 to a display screen 61. Light from the projection optics 54 is reflected off the fold mirror 56 to the display screen 61.

Figure 2:
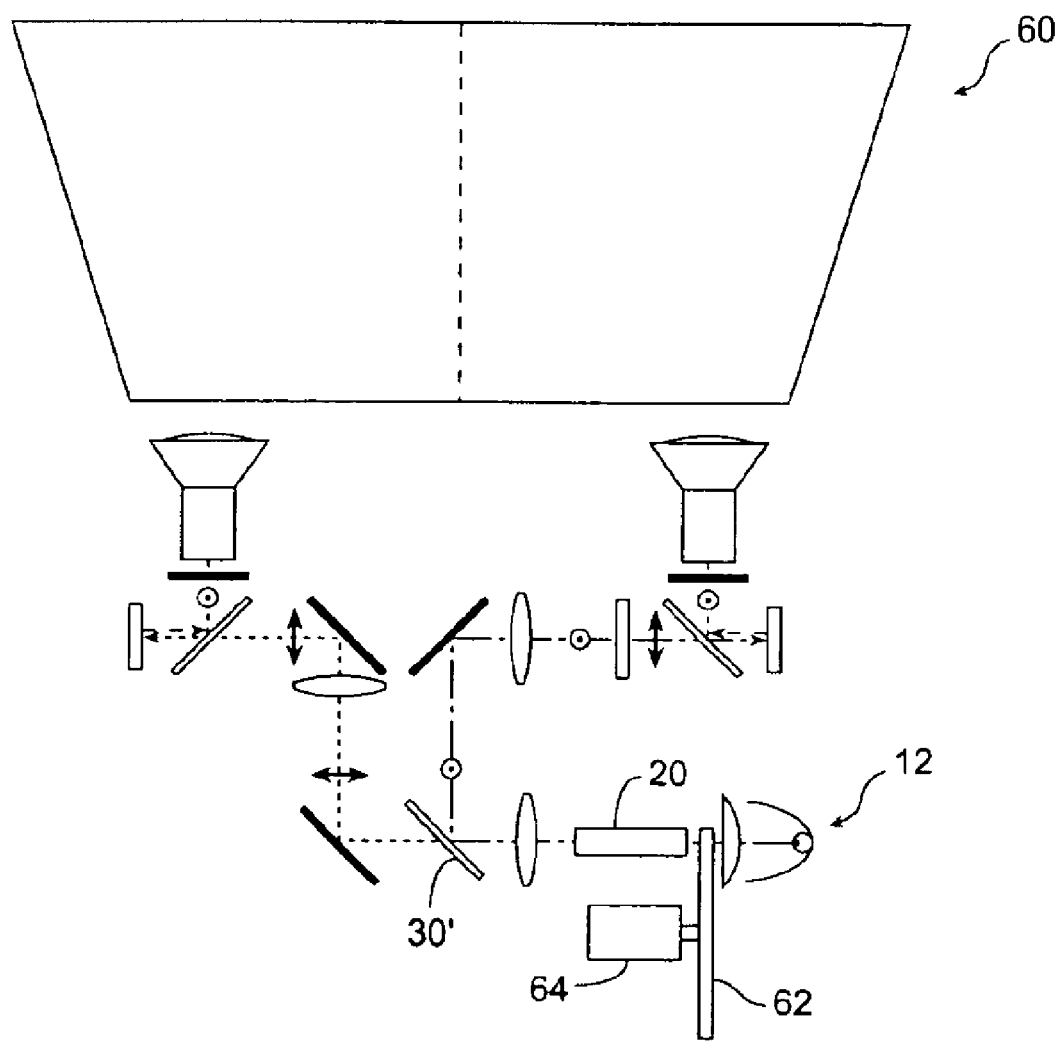
FIG. 2 is a simplified diagram of a color image display system according to another embodiment of the present invention.

FIG. 2 is a simplified diagram of a color image display 60 system according to another embodiment of the present invention. A color wheel 62 between the light integrator 20 and the lamp 12 transmits a selected color(s) of light to the light integrator. A color wheel motor 64 rotates the color wheel 62 to sequentially present different colored filters between the lamp 12 and the light integrator 20. Alternatively, a color wheel is located after the output of the light integrator 20. In a further embodiment, a color wheel located after the output of a recirculating light integrator has dichroic color filter segments that transmit a colored light beam to a beam splitter 30', such as a pre-polarizer, for separation into first and second colored light beams.

The first and second light beams have complimentary polarization states and are coupled to the SLMs ("imagers"). The non-selected color(s) are optionally reflected back into the light integrator to be recycled, thus increasing color light output efficiency. In a particular embodiment the dichroic color filter segments are logarithmic spiral color filter segments that generate scrolling color bands. It is generally desirable that the imagers operate sufficiently fast to permit sequential color operation at frame rates sufficient to eliminate color break-up or other color artifacts in the displayed image.

Figure 3:
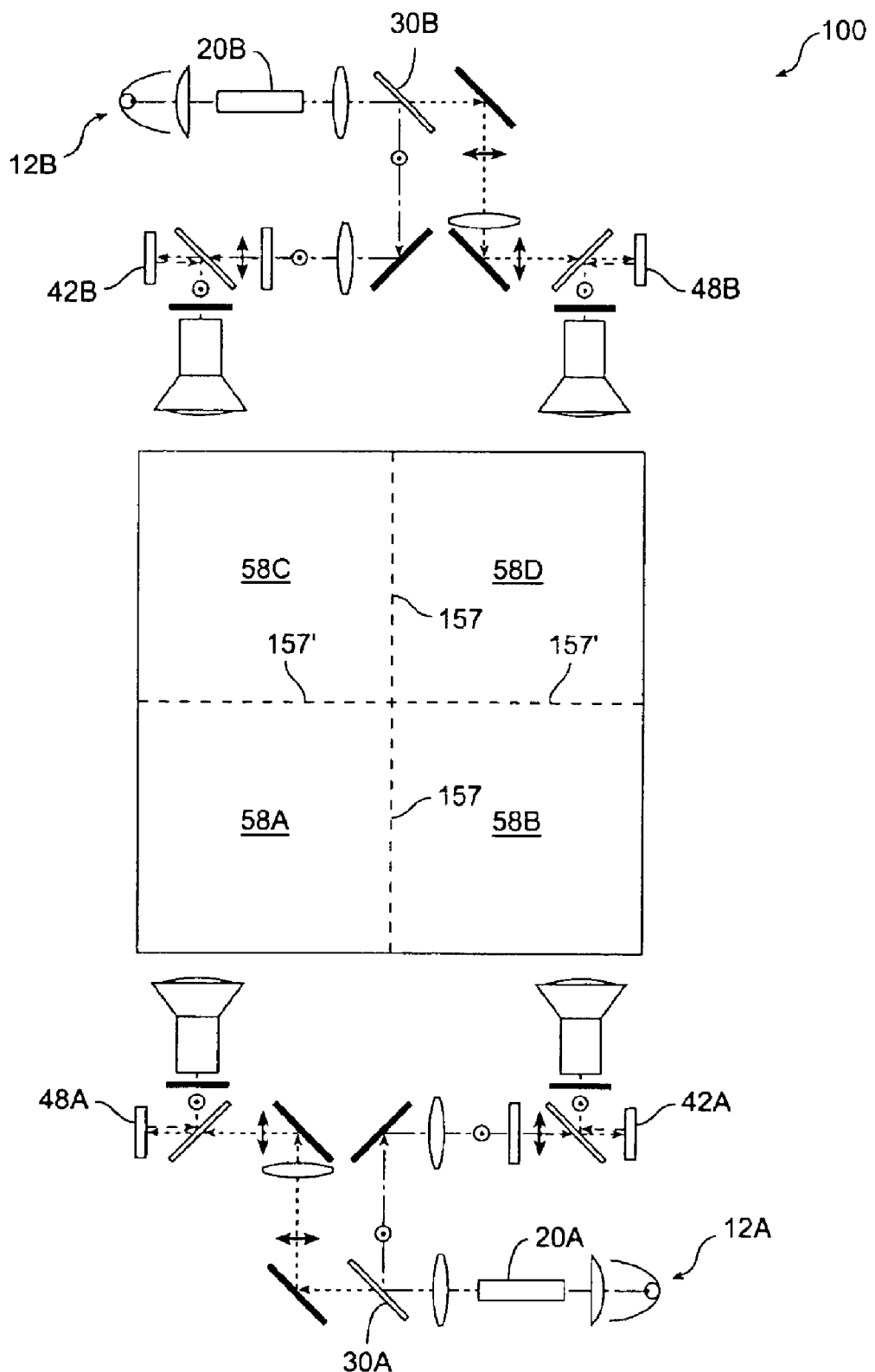
FIG. 3 is simplified diagram of a multi-lamp stitched image display system according to an embodiment of the present invention.

FIG. 3 is simplified diagram of a multi-lamp image display system 100 according to an embodiment of the present invention. The multi-lamp image display system 100 has a first lamp 12A whose output is homogenized by a first light integrator 20A and is split by a first polarizing beam splitter 30A, and a second lamp 12B whose output is homogenized by a second light integrator 20B and is split by a second polarizing beam splitter 30B. The light from the two lamps 12A, 12B are coupled to imagers 42A, 48B, 42A, 48B.

The resulting displayed image, which is made up of four image portions 58A, 58B, 58C, 58D stitched together at margins 157, 157' has a resolution essentially equal to the sum of pixels generated by the imagers 42A, 42B, 48A, 48B. The fold mirror 156 is typically rectangular, but this is not required, and reflects the image portions to a display screen (not shown). Alternatively, multiple fold mirrors are used. In a particular embodiment each imager generates about two million pixels and the displayed image has about eight million pixels. Additional lamps, light integrators, imagers, and projection optics may be combined to further increase the number of pixels in the displayed image.

While the invention has been described above in terms of various specific embodiments, the invention may be embodied in other specific forms without departing from the spirit of the invention. Thus, the embodiments described above illustrate the invention, but are not restrictive of the invention, which is indicated by the following claims. All modifications and equivalents that come within the meaning and range of the claims are included within their scope.

We claim:

1. A display system comprising:
   a lamp providing a lamp output;
   a light integrator optically coupled to receive the lamp output from the lamp and for providing a homogenized light output;
   a beam splitter optically coupled to receive the homogenized light output from the light integrator and configured to provide a first light beam having a first polarization state and a second light beam having a second polarization state;
   a first imager optically coupled to receive the first light beam for producing a first modulated light beam, wherein the first imager is a first spatial light modulator;
   first projection optics optically coupled to receive the first modulated light beam and configured to expand the first modulated light beam to form a first display image portion;
   a second imager optically coupled to receive the second light beam and for producing a second modulated light beam, wherein the second imager is a second spatial light modulator;
   a second polarizing beam splitter disposed between the polarizing beam splitter and the first spatial light modulator; and
   a third polarizing beam splitter disposed between the polarizing beam splitter and the second spatial light modulator, and
   second projection optics optically coupled to the second light beam and configured to expand the second modulated light beam to form a second display image portion, wherein the first display image portion and the second image display portion are combined at a margin to form a display.

2. The display system of claim 1 wherein further comprising a half-wave retarder plate disposed between the polarizing beam splitter and the first spatial light modulator.

3. The display system of claim 2 wherein the polarizing beam splitter is a wire-grid polarizing beam splitter.

4. The display system of claim 1 wherein the first imager is a first type of imager and the second imager is a second type of imager different from the first type of imager.

5. The display system of claim 1 wherein the first projection optics provide a first optical path length between the light integrator and the first display image portion and the second projection optics provide a second optical path length between the light integrator and the second display image portion, the first optical path length being essentially the same as the second optical path length.

6. The display system of claim 1 further comprising a color wheel disposed between the lamp and the beam splitter.

7. The display system of claim 6 wherein the color wheel is disposed between the lamp and the light integrator.

8. The display system of claim 1 wherein the first imager generates a first number of pixels, the second imager generates a second number of pixels, and the display image has a third number of pixels essentially equal to a sum of the first number of pixels and the second number of pixels.

9. The display system of claim 8 wherein the first number of pixels is about two million pixels and the second number of pixels is about two million pixels, the third number of pixels being about four million pixels.

10. The display system of claim 1 further comprising:
    a second lamp providing a second lamp output;
    a second light integrator optically coupled to the second lamp output from the second lamp and providing a second homogenized light output;
    a second beam splitter optically coupled to the second homogenized light output from the second light integrator and configured to provide a third light beam and a fourth light beam;
    a third imager optically coupled to the third light beam and producing a third modulated light beam;
    third projection optics configured to expand the third modulated light image portion to form a third display image portion;
    a fourth imager optically coupled to the fourth light beam and producing a fourth modulated light beam;
    fourth projection optics optically coupled to the fourth modulated light beam and configured to expand the fourth modulated light beam to form a fourth display image portion, wherein the first display image portion, the second display image portion, the third display image portion, and the fourth display image portion are combined at margins to form the display image.

11. The display system of claim 1 further including a fold mirror optically coupled to receive light from the first and second spatial light modulator and for folding the beam to be directed to a display screen.

12. A display system comprising:

a lamp providing a lamp output;

a light integrator optically coupled to the lamp output from the lamp and providing a homogenized light output;

a beam splitter optically coupled to the homogenized light output from the light integrator and configured to provide a first light beam and a second light beam;

a first imager optically coupled to the first light beam and producing a first modulated light beam;

first projection optics optically coupled to the first modulated light beam and configured to expand the first modulated light beam to form a first display image portion;

a second imager optically coupled to the second light beam and producing a second modulated light beam; and second projection optics optically coupled to the second light beam and configured to expand the second modulated light beam to form a second display image portion on the display screen, wherein the first display image portion and the second image display portion are combined at a margin to form a display image, wherein the beam splitter is a polarizing beam splitter, the first light beam has a first polarization state, and the second light beam has a second polarization state, wherein the polarizing beam splitter is a wire-grid polarizing beam splitter, wherein the first imager is a first liquid-crystal-on-silicon spatial light modulator and the second imager is a second liquid-crystal-on-silicon spatial light modulator, and further comprising:

a half-wave retarder plate disposed between the polarizing beam splitter and the first liquid-crystal-on-silicon spatial light modulator;

a second polarizing beam splitter disposed between the half-wave retarder plate and the first liquid-crystal-on-silicon spatial light modulator; and a third polarizing beam splitter disposed between the polarizing beam splitter and the second liquid-crystal-on-silicon spatial light modulator.

13. The display system of claim 12 further comprising:

a first polarization analyzer disposed between the first liquid-crystal-on-silicon spatial light modulator and the first projection optics; and a second polarization analyzer disposed between the second liquid-crystal-on-silicon spatial light modulator and the second projection optics.

14. The display system of claim 12 wherein the first liquid-crystal-on-silicon spatial light modulator is a first analog spatial light modulator and the second liquid-crystal-on-silicon spatial light modulator is a second analog spatial light modulator.

15. The display system of claim 12 further comprising a trapezoidal post projection lens fold mirror disposed between the first liquid-crystal-on-silicon spatial light modulator and the second liquid-crystal-on-silicon spatial light modulator, and a display screen.

* * * * *